US010395343B2

(12) United States Patent
Chaouch

(10) Patent No.: US 10,395,343 B2
(45) Date of Patent: Aug. 27, 2019

(54) METHOD AND DEVICE FOR THE REAL-TIME ADAPTIVE FILTERING OF NOISY DEPTH OR DISPARITY IMAGES

(71) Applicant: COMMISSARIAT A L'ENERGIE ATOMIQUE ET AUX ENERGIES ALTERNATIVES, Paris (FR)

(72) Inventor: Mohamed Chaouch, Arcueil (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 291 days.

(21) Appl. No.: 15/524,217

(22) PCT Filed: Nov. 18, 2015

(86) PCT No.: PCT/EP2015/076964
§ 371 (c)(1),
(2) Date: May 3, 2017

(87) PCT Pub. No.: WO2016/079179
PCT Pub. Date: May 26, 2016

(65) Prior Publication Data

US 2017/0337665 A1 Nov. 23, 2017

(30) Foreign Application Priority Data

Nov. 20, 2014 (FR) ..................................... 14 61260

(51) Int. Cl.
*G06T 5/00* (2006.01)
*G06T 7/50* (2017.01)

(52) U.S. Cl.
CPC ................ *G06T 5/002* (2013.01); *G06T 7/50* (2017.01); *G06T 2207/10028* (2013.01); *G06T 2207/20012* (2013.01); *G06T 2215/16* (2013.01)

(58) Field of Classification Search
CPC .. G06T 5/002; G06T 5/50; G06T 7/50; G06T 7/174; G06T 2207/10028;
(Continued)

(56) References Cited

U.S. PATENT DOCUMENTS 7,386,156 B2 * 6/2008 Hornegger ............ A61B 6/032 382/130
8,396,283 B2 * 3/2013 Iihoshi .............. G06K 9/00234 382/106

(Continued)

FOREIGN PATENT DOCUMENTS

EP 2 541 496 A2 1/2013
WO 2013/079602 A1 6/2013

OTHER PUBLICATIONS

M. Camplani and L. Salgado, "Efficient spatio-temporal hole filling strategy for Kinect depth maps," in Proc. SPIE Int. Conf. 3-D Image Process. Appl., vol. 8290, 2012, pp. 1-10. (Year: 2012).*

(Continued)

*Primary Examiner* — Michael S Osinski
(74) *Attorney, Agent, or Firm* — Baker & Hostetler LLP

(57) ABSTRACT

A method and a device for filtering the aberrations of disparity or depth images using an adaptive approach are described. The method allows the local filtering of those points which are not spatially coherent in their 3D neighborhood, according to a criterion derived from a geometrical reality of the transformations carried out on the light signals. Advantageously, the noise filtering method may be applied to a dense depth image or to a dense disparity image.

11 Claims, 9 Drawing Sheets

(58) Field of Classification Search
CPC . G06T 2207/20012; G06T 2207/20112; G06T 2207/30; G06T 2207/30004–30248; G06T 2215/16; G06T 17/00; H04N 13/128; H04N 13/204–207; H04N 13/25; H04N 13/271; H04N 13/111; H04N 13/275–279; G06K 9/46; G06K 9/4604
See application file for complete search history.

(56) References Cited

U.S. PATENT DOCUMENTS

| | | | | |
|---|---|---|---|---|
| 8,411,149 | B2 * | 4/2013 | Maison | G06K 9/00369 348/207.1 |
| 8,982,117 | B2 * | 3/2015 | Park | H04N 13/398 345/419 |
| 9,292,927 | B2 * | 3/2016 | Reif | G06T 7/593 |
| 9,383,548 | B2 * | 7/2016 | Lansel | G02B 13/0015 |
| 9,488,721 | B2 * | 11/2016 | Kitajima | G01S 7/4802 |
| 9,811,880 | B2 * | 11/2017 | Mundhenk | G06T 3/4007 |
| 9,858,475 | B2 * | 1/2018 | Itkowitz | G06K 9/00375 |
| 9,874,938 | B2 * | 1/2018 | Murase | G06T 7/73 |
| 10,095,953 | B2 * | 10/2018 | Smolic | G06K 9/52 |
| 10,154,241 | B2 * | 12/2018 | Svortdal | G06T 3/00 |
| 2004/0258289 | A1 * | 12/2004 | Hornegger | A61B 6/032 382/130 |
| 2009/0244309 | A1 * | 10/2009 | Maison | G06K 9/00369 348/222.1 |
| 2011/0282140 | A1 * | 11/2011 | Itkowitz | G06K 9/00375 600/109 |
| 2011/0285910 | A1 * | 11/2011 | Bamji | G01S 17/89 348/631 |
| 2012/0263353 | A1 | 10/2012 | Kitajima et al. | |
| 2012/0327079 | A1 * | 12/2012 | Park | H04N 13/398 345/419 |
| 2013/0293539 | A1 * | 11/2013 | Hunt | G01B 11/00 345/420 |
| 2014/0132733 | A1 * | 5/2014 | Mundhenk | G06T 3/4007 348/47 |
| 2014/0184584 | A1 * | 7/2014 | Reif | G06T 7/593 345/419 |
| 2015/0146939 | A1 * | 5/2015 | Datta | A01K 67/00 382/110 |
| 2015/0287211 | A1 * | 10/2015 | Mundhenk | G06T 7/143 382/173 |
| 2015/0362698 | A1 * | 12/2015 | Lansel | G02B 13/0015 348/360 |
| 2016/0132121 | A1 * | 5/2016 | Murase | G06T 7/73 345/156 |
| 2016/0173850 | A1 * | 6/2016 | Zhang | G09B 29/005 348/43 |
| 2016/0191898 | A1 * | 6/2016 | Xu | H04N 13/239 348/47 |
| 2017/0237969 | A1 * | 8/2017 | Zhao | G06T 7/593 382/154 |
| 2017/0289516 | A1 * | 10/2017 | Svortdal | G06T 3/00 |
| 2018/0033150 | A1 * | 2/2018 | Lieblich | G06T 15/08 |

OTHER PUBLICATIONS

Kolb, A.; Barth, E.; Koch, R.; Larsen, R. "Time-of-Flight Sensors on Computer Graphics." In Proceedings of the Eurographics (State-of-the-Art Report), Munich, Germany, Mar. 30-Apr. 3, 2009. (Year: 2009).*

H. Hirschmuller and D. Scharstein. "Evaluation of stereo matching costs on images with radiometric differences." IEEE TPAMI, 31(9):1582-1599, 2009. (Year: 2009).*

"Adaptive cross-trilateral depth map filtering." Marcus Mueller, Frederik Zilly, Peter Kauff, 2010 3DTV-Conference: The True Vision—Capture, Transmission and Display of 3D Video (Year: 2010).*

Jaesik et al., "High quality depth map unsampling for 3D-TOF cameras," 2011 IEEE International Conference on Computer Vision (ICCV), Nov. 6, 2011, pp. 1623-1630, XP032101376.

T. Weyrich et al., "Post-processing of Scanned 3D Surface Data," Eurographics Symposium on Point-Based Graphics, Jan. 1, 2004, XP055088637.

Jian Wang et al., "Variable window for outlier detection and impulsive noise recognition in range images," 2014 14th IEEE/ACM International Symposium on Cluster, Cloud and Grid Computing, May 26, 2014, pp. 857-864, XP032614443.

* cited by examiner

Projection of six local supports

Disparity image showing a noisy scene containing six cubes of the same size at different positions Geometrical reality image $R_g(u,v)$ calculated at each non-zero disparity point with a spherical support of fixed size Spatial coherence image $C_s(u,v)$ calculated at each non-zero disparity point with a spherical support of fixed size Filtering image $F(u,v) = \mathcal{F}\,(\,C_s(u,v),\, R_g(u,v)\,)$ Decision image $F_5(u,v)$ Denoised disparity image

METHOD AND DEVICE FOR THE REAL-TIME ADAPTIVE FILTERING OF NOISY DEPTH OR DISPARITY IMAGES

CROSS-REFERENCE TO RELATED APPLICATIONS

This application is a National Stage of International patent application PCT/EP2015/076964, filed on Nov. 18, 2015, which claims priority to foreign French patent application No. FR 1461260, filed on Nov. 20, 2014, the disclosures of which are incorporated by reference in their entirety.

FIELD OF THE INVENTION

The invention relates to the field of image processing and computer vision and, in particular, to the processing of noisy depth or disparity images.

BACKGROUND

The analysis of scenes in images (such as image segmentation, background subtraction, automatic object recognition and multiclass detection) is a field that has been widely covered in the literature, mainly for "single-sensor" (2D) images. Benefiting from the latest advances in 3D perception, scene analysis also attempts to make use of depth information, since an object is not only a coherent visual unit in terms of color and/or texture, but also a spatially compact unit.

Multiple types of 3D perception system are known:

Equipment such as 3D scanners or time-of-flight (TOF) cameras. This type of 3D sensor provides a depth image in which each pixel corresponds to the distance between a point of the scene and a specific point. The depth images obtained are generally quite precise, but they nonetheless include aberrations (for example "speckle" in the case of TOF cameras). They are expensive, from a thousand to several thousand euros, limiting their use to applications in which cost is not a main obstacle. Moreover, a number of these 3D sensors cannot be used in real-time applications due to the low frequency of the images.

Stereoscopic systems, generally consisting of an assembly of cameras and/or projectors, in combination with specific processing operations (for example disparity computation). These benefit from the lower cost of standard cameras, or even cameras that may already be present for other applications (for example the reversing camera function). However, these images are noisier (sensitivity to lighting conditions, problems with lightly textured surfaces, etc.) and the depth image deduced from the disparity map is not dense. The non-linear transformation {disparity map→depth map} exhibits a non-uniform information density in the depth map. Typically, data close to the camera will be denser, and data on the object boundary will potentially be imprecise.

The quality of the depth image or of the disparity image has a substantial impact on the performance of processing operations performed on this image. In the case of stereoscopic images, substantial errors in the depth image are even more detrimental to the processing operations performed.

Thus 3D scene analysis systems (for example scene segmentation) are either expensive or negatively affected by errors present in the depth map.

A filtering of the data linked to the depth may be performed on the disparity map. Aberrant errors are conventionally treated by median filters. The only parameter of this filter is the size (or the shape) of the support. 3*3 or 5*5 square supports are typically used.

While noise removal capability increases with the size of the support, this is nonetheless accompanied by the removal of details, along with the potential displacement of edges in the presence of noise. In the context of segmentation, this can lead to imprecise segmentation, and it should be noted that this effect is not uniform across the depth image or across the disparity image.

However, using a small support decreases the filtering capability. If the level of noise is statistically significant, the filtering thereof will only be partial.

Thus, the choice of filter size is a trade-off between the removal of aberrations and image deformation. This choice is left up to the user, and there is no method for automatically determining an "optimum" value.

In the article entitled "Rapid 3D object detection and modeling using range data from range imaging camera for heavy equipment operation" by Son, Kim & Choi, published in "Automation in Construction" Vol. 19, pp. 898-906, Elsevier, 2010, the authors present a 3D scene segmentation system, consisting of a time-of-flight camera and processing software including successive steps for decreasing noise in depth images, subtracting ground elements, segmenting objects and creating volumes surrounding objects. The limits of such an approach are that the system requires a time-of-flight camera, which is an expensive device, and the filtering operations are adapted to the type of noise linked to the sensor. The filtering uses fixed supports, without considering the local characteristics of the signal: a 3*3 mean difference filter combined with a fixed threshold of 0.6 for filtering aberrant values of "dropout" type (a wave that has not been received by the sensor) and a 3*3 median filter for correcting speckle noise. Furthermore, as mentioned above, a fixed support size and a fixed threshold do not allow the trade-off between filtering/preservation of the signal to be optimized according to the local and actual characteristics of the signal, in particular those linked to the geometry of a 3D approach. Lastly, the global approach to segmentation uses a dense 3D mesh allowing fine segmentation, but its computing time, of the order of one second, remains long.

In patent application EP 2541496 (A2) "Method, medium, and apparatus for filtering depth noise using depth information" by Samsung Electronics, a method for filtering depth noise may carry out spatial or temporal filtering according to the depth information. In order to carry out spatial filtering, the method is able to determine a characteristic of the spatial filter on the basis of depth information. Likewise, in order to carry out temporal filtering, the method is able to determine a certain number of frames of reference on the basis of depth information. Although this solution adapts the size and the coefficient of the filter to be applied according to the depth of the region to be processed, it still has drawbacks including, inter alia, the characteristics of the filter not taking account of the distance of objects from the optical center of the camera.

In patent application WO 2013079602 (A1) "Spatio-temporal disparity-map smoothing by joint multilateral filtering" by Kauff P. et al. a filter structure intended to filter a disparity map D(p, t0) comprises a first filter, a second filter and a filter selector. The first filter is intended to filter a specific section of the disparity map according to a first measure of central tendency. The second filter is intended to filter the specific section of the disparity maps according to a second measure of central tendency. The filter selector is provided in order to select the first filter or the second filter in order to filter the specific section of the disparity map, the selection being based on at least one local property of the specific section. This approach, which only works on the disparity map, is dependent on the selection of a fixed threshold for the filter of choice, which is not consistent with physical or geometrical reality.

Thus, there exists no solution in the prior art that allows the quality of a depth image, and consequently that of subsequent processing, to be enhanced while maintaining a low system cost.

Furthermore, there exists no known approach that takes account of the geometrical reality of the operations performed on the original light signal.

There is a need then for a solution that overcomes the drawbacks of the known approaches. The present invention addresses this need.

SUMMARY OF THE INVENTION

One subject of the present invention is to propose a device and a method for filtering the aberrations of disparity or depth images using an adaptive approach.

The proposed approach allows the local filtering of those points which are not spatially coherent in their 3D neighborhood, according to a criterion derived from a geometrical reality of the transformations carried out on the light signals.

The adaptive filtering of the present invention improves upon the existing methods by stabilising, over the entire 3D space, the trade-off between filtering capability/preservation of details, which trade-off is adjusted to a value that can be specified by the user.

The proposed noise-filtering method performed on a dense depth image or on a dense disparity image makes it possible to enhance the quality and the efficiency of later processing operations, such as the automatic segmentation of an observed scene, i.e. the automatic decomposition of the scene into multiple constituent elements.

The device of the invention may be inserted into a processing chain as post-processing of noisy depth images or noisy disparity images and/or as pre-processing for scene analysis applications using a depth image or a disparity image.

Advantageously, the proposed solution is characterized by:

- adapted filtering of 3D data, taking account of the spatial coherence of data and the geometrical reality of the operations performed on the original signal (the light waves);
- controlled system cost, via the use of a stereoscopic sensor;
- an approach requiring minimal computing resources and allowing real-time deployment on standard, inexpensive computing architectures.

Advantageously, the filtering parameters are optimized locally, taking into consideration the geometrical realities of the transformations on the light signal.

Thus, the trade-off between filtering capability and the preservation of details is managed automatically, adapting to spatial locations (spatial uniformity), and being dependent on only one intuitive parameter left to the choice of the user and valid over the entire 3D zone in question.

Advantageously, the characteristics of the filter of the present invention depend not only on the depth but also on the distance of objects from the optical center of the camera.

More generally, the adaptations of the filter parameters are not based on empirical equations (in this instance linear equations) but are based on the realities of geometrical transformations. The filter parameters are also dynamically dependent on a spatial coherence criterion of the data.

Advantageously, the filter is not directly applied to the data in order to output a filtered image, but the proposed method allows an image of the pixels that must be filtered to be produced, which pixels are subsequently processed separately. Thus, those pixels considered to be valid are not modified in any way.

The present invention will be of use in any real-time application aiming to analyse all or part of a 3D scene and using a disparity image or a depth image as input.

All of the parties involved in video surveillance, video protection or video assistance, as well as those the application of which involves a feedback of information on the content of a scene, will find the method of the invention to be of use.

In order to obtain the desired results, a method and a device are proposed.

In particular, a method for filtering an initial 3D image comprises the steps of:

- defining a local analysis zone for each 3D point that is associated with each pixel of the initial image;
- generating a spatial coherence image for the set of 3D points that are associated with the set of pixels of the initial 3D image, on the basis of a spatial coherence value measured for each 3D point in the local analysis zone;
- generating a geometrical reality image for the set of 3D points that are associated with the set of pixels of the initial 3D image, on the basis of a geometrical reality value measured for each 3D point in the local analysis zone;
- generating a binary image on the basis of the spatial coherence and geometrical reality images, in which each point of the binary image is classed as a scene point or as a noise point according to the spatial coherence and geometrical reality values obtained for that point; and
- combining the binary image with the initial 3D image in order to obtain a denoised image.

Advantageously, the local analysis zone—S(P(u,v))—consists of a 3D volume of fixed size, centered on the coordinates P(u, v) of a 3D point that is associated with a pixel.

In one embodiment, the step of measuring a spatial coherence value—Cs(u,v)—for a 3D point comprises the steps of determining the set of pixels of the initial image, the associated 3D points of which pixels are contained in the local analysis zone for said 3D point; and defining a spatial coherence value for said 3D point depending on the result.

In one embodiment, the step of measuring a geometrical reality value—Rg(u,v)—for a pixel associated with a 3D point comprises the steps of projecting the local analysis zone into an empty scene; determining the set of 3D points that are visible in the local analysis zone of the empty scene; and defining a geometrical reality value for said pixel depending on the result.

In one embodiment, the step of generating a binary image comprises the steps of generating, for each 3D point, a filtering value on the basis of the spatial coherence and geometrical reality values; comparing the obtained filtering value with a threshold value; classing the 3D point as a scene point or as a noise point depending on the result of the comparison; and generating an image of the set of scene and noise points.

In one embodiment, the initial image is a disparity image. In one variant implementation, the initial image is a depth image.

In the embodiments, the local analysis zone is chosen from a group comprising spherical, cubic, box-shaped or cylindrical representations, or 3D mesh surface representations, voxel representations or algebraic representations.

In one embodiment, the geometrical reality value is pre-computed.

The invention also covers a device for filtering an initial noisy image, the device comprising means for implementing the steps of the method as claimed.

The invention may operate in the form of a computer program product that comprises code instructions allowing the steps of the claimed method to be carried out when the program is executed on a computer.

DESCRIPTION OF THE FIGURES

Various aspects and advantages of the invention will appear in support of the description of one preferred, but non-limiting, mode of implementation of the invention, with reference to the figures below.

DETAILED DESCRIPTION OF THE INVENTION

Figure 1:
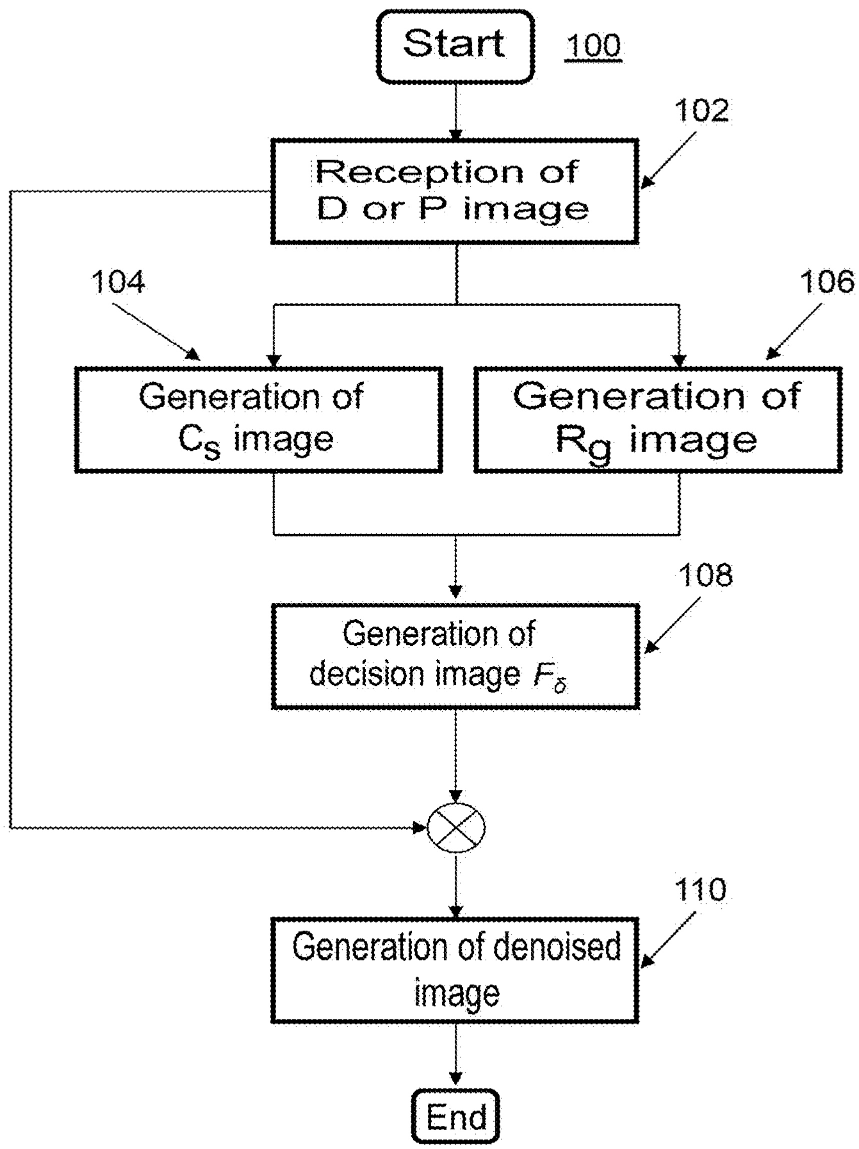
FIG. 1 illustrates the steps of the method for obtaining a denoised image according to one embodiment of the invention.

Reference is made to FIG. 1, which illustrates, in a general manner, the steps of the method (100) of the invention allowing a denoised image to be obtained. The method begins when an initial image representing a scene must be denoised (102). The initial 3D image may be obtained using stereoscopic vision and 3D data processing techniques, in which a scene is represented by a pair of images taken from different angles.

Advantageously, the method (100) may be applied to an initial disparity D or depth P image.

It is known that, in order to calculate the disparity of a point of a scene, it is necessary to have the coordinates of its two projections in the left and right images. To achieve this, matching algorithms are used and aim to find, for a given point in an image, its corresponding point in the other image. Once the disparities of the points of a scene have been calculated, a cloud of corresponding points of the scene is produced.

It is also known that the disparity 'd' of a point of a scene and its depth 'z' with respect to the camera are linked. This link is defined by the following equation (1):

$$z*d=B*f \qquad \text{[Eq1]}$$

since 'B', which is known as the 'baseline' or the distance between the two optical centers of the cameras, and 'f', which is the focal distance (the same for both cameras) have constant values, a variation in disparity 'd' depends directly on a variation in the distance 'z' between a point and the cameras.

The coordinates (x, y, z) of a point of a scene corresponding to a pixel with coordinates (u, v) and with disparity 'd' are then calculated according to the following equations (2, 3, 4):

$$z=B*f/d \qquad \text{[Eq2]}$$

$$x=(u-u0)*z/f \qquad \text{[Eq3]}$$

$$y=(v-v0)*z/f \qquad \text{[Eq4]}$$

where (u0,v0) corresponds to the coordinates of the projection of the optical center in the image.

Similarly, there is a relationship between the area of the apparent surface of an object of a scene in the image and the area of the actual surface of the visible portion of the object. A large variation in the distance from the object to the optical center of the camera involves a substantial change in the area of the apparent surface of the object in the disparity images. This observation also applies to depth images. Additionally, in the case of denoising using a filter of fixed size as in the prior art, for example a median filter, since the change in aspect is too great, the process will perform its filtering function in a limited area of the image, but it will fail in the rest of the image.

Furthermore, advantageously, the present invention proposes a new filtering method adapted to 3D data that uses optimized thresholding. The method takes account of the spatial coherence of the data and the geometrical reality of the operations performed on the signal. To achieve this, two new measurements are introduced: spatial coherence—Cs— and geometrical reality—Rg—.

Throughout the rest of the description, the following notation is used:

- for depth images: R(u,v) denotes a pixel with coordinates u and v in the depth image, and P(u,v) denotes its associated 3D point with coordinates (x,y,z);
- for disparity images: D(u,v) denotes a pixel with coordinates u and v in the disparity image, and P(u,v) denotes its associated 3D point with coordinates (x,y,z), which are calculated according to equations (2, 3, 4).

Returning to FIG. 1, after receiving the initial disparity or depth image, the method allows two new images to be generated on the basis of the initial image, a first image, referred to as the spatial coherence image (104), and a second image, referred to as the geometrical reality image (106). Next, the method allows the spatial coherence and geometrical reality images to be combined in order to generate (108) a third image, referred to as the decision image, which will be described in detail with reference to FIG. 4.

In a subsequent step, the decision image is combined with the initial image in order to generate (110) a denoised image of the scene under analysis.

The denoised image can then be used in a scene analysis method, such as image segmentation, background subtraction, automatic object recognition or multiclass detection.

For example, the present invention in combination with a 3D segmentation method, which decomposes a scene into separate real objects, makes it possible to provide for example localized obstacle detection. Advantageously, the method of the invention, which generates a denoised image of enhanced quality, makes it possible to improve the computing time of a segmentation operation, which is of the order of one hundredth (1/100) of a second.

The denoised image may also advantageously be used to provide a simple visualization of the disparity or depth image, enhancing reading comfort and ease of interpretation for a human user.

FIGS. 7*a* to 7*f* illustrate the images obtained in the various steps of the filtering method of FIG. 1 according to one embodiment of the invention.

Figure 2:
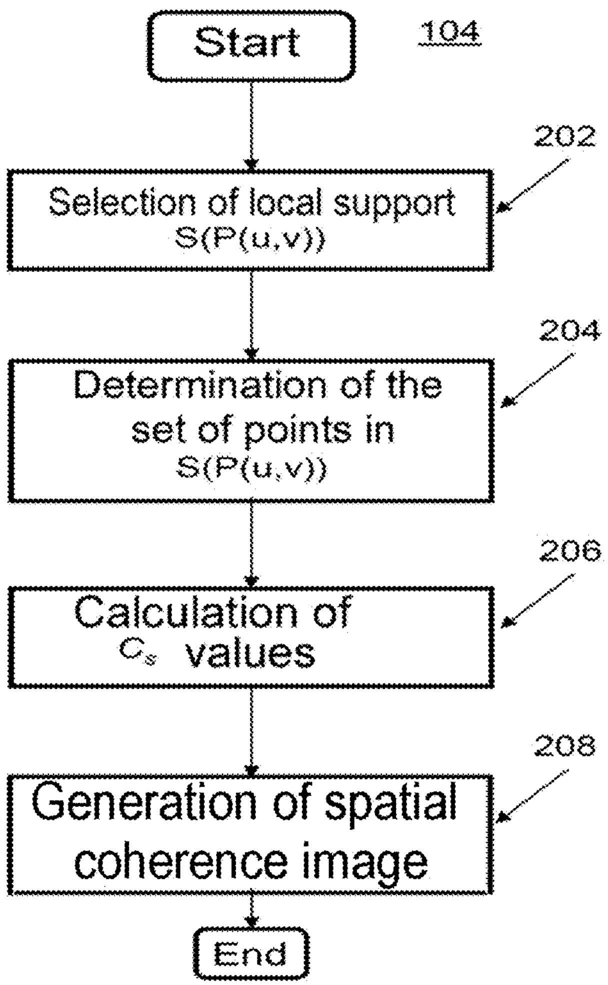
FIG. 2 illustrates the steps of the method for obtaining a spatial coherence image according to one embodiment of the invention.

FIG. 2 illustrates the steps of the method (104) of FIG. 1, allowing a spatial coherence image to be generated in one embodiment of the invention. The initial image may be a disparity image or, in one variant implementation, a depth image.

In a first step (202), the method allows a local support of 3D volume—S(P(u,v))—of fixed size 's' and centered on a point P(u,v) to be selected. The size 's' is the volumetric granularity or precision desired by a user for the elements of the scene to be analysed.

Various types of representations of the support 'S' may be adopted:

- elementary spherical, cubic, box-shaped or cylindrical representation;
- 3D mesh surface representation;
- voxel representation; or
- algebraic representation such as implicit surfaces of the type f(x,y,z)=0.

In the next step (204), the method allows the set of points, the 3D projection of which is contained in the selected local support S(P(u,v)), to be determined.

A spatial coherence measurement is calculated in the next step (206) on the basis of the number of points counted, for each pixel with coordinates (u,v), in terms of depth or in terms of disparity according to the embodiment. Those skilled in the art will understand that the greater the number of points around a pixel, the better the spatial coherence, and vice versa: a low number of points around a pixel indicates low spatial coherence, which may mean that the pixel represents noise.

Thus, the spatial coherence criterion—$C_s(u,v)$—is constructed as a function $\phi$ (E) based on the set of pixels of the actual initial image, the associated 3D points of which belong to the selected local support centerd on P(u,v), such that:

$$C_s(u,v)=\leq(E),$$

where

- E={R(u',v') such that P(u',v') $\in$ S(P(u,v))} in the case of a depth image; and
- E={D(u',v') such that D(u',v') $\in$ S(P(u,v))} in the case of a disparity image.

In one preferred embodiment, the spatial coherence criterion is defined according to the following equation:

$$C_s(u,v)=\leq(E)=\text{Card}(E) \quad \text{[Eq5]},$$

where the 'Card' function denotes the cardinal function, i.e. the size of E.

Once the spatial coherence values have been calculated for all of the pixels of the initial image, the method allows a spatial coherence image to be generated (208).

Figure 3:
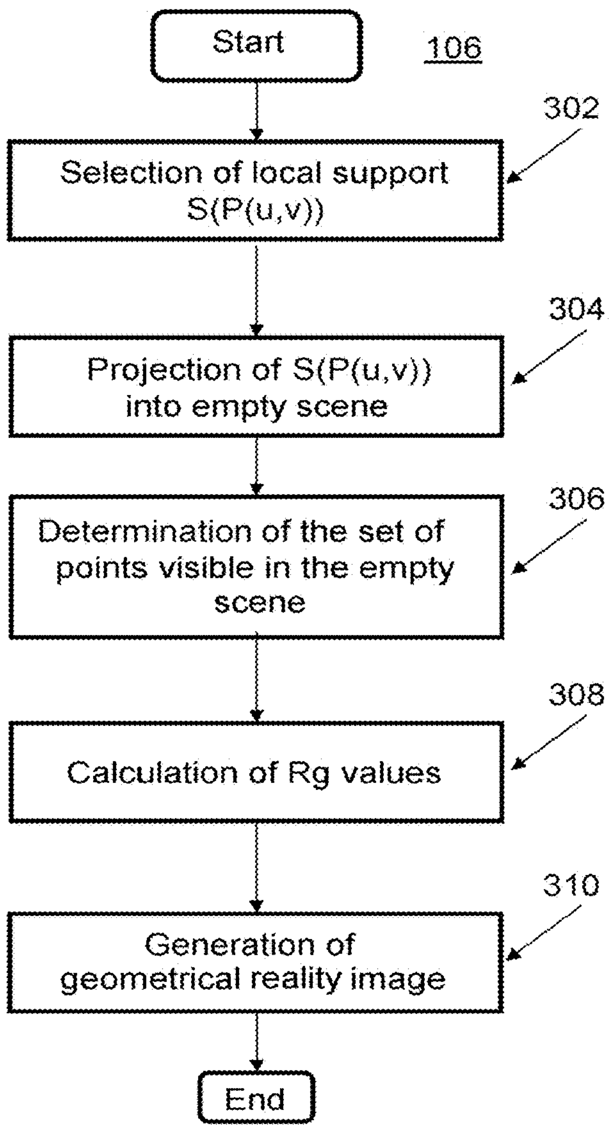
FIG. 3 illustrates the steps of the method for obtaining a geometrical reality image according to one embodiment of the invention.

FIG. 3 illustrates the steps of the method (106) of FIG. 1 allowing a geometrical reality image to be generated in one embodiment of the invention, on the basis of the initial image which may be a disparity image or, in one variant implementation, a depth image.

In a first step (302), the method allows a local support of 3D volume—S(P(u,v))—of fixed size 's' and centered on a point P(u,v) to be selected. In one preferred embodiment, the support selected for the methods (104) and (106) is the same.

The method next allows (304) the local support to be projected, for each pixel, into an empty scene. The projection step is carried out for all of the disparity or depth values located at any pixel position (u,v) of the 2D image, and in a predefined functional range, with a defined functional granularity of disparity (or depth, respectively). Thus the projections correspond to geometrical realities of the "2D-to-3D" transformation. They remain valid for the duration of operation of the system as long as the optical parameters remain unchanged (internal calibration of each camera, harmonization of the stereoscopic pair, height and orientation of the stereo head in its environment).

The next step (306) makes it possible to determine the number of points that appear in the projected support, i.e. the set of points that are visible in the empty scene, in order to make it possible to calculate, in the next step (310), a measurement of the geometrical reality—Rg(u,v)—for each pixel with coordinates (u,v), in terms of depth or disparity according to the mode of implementation.

Thus the geometrical reality criterion—$R_g(u,v)$—is constructed as a function based on the set of active pixels, i.e. those that have disparities or projections that are defined, associated with visible points of the local support.

In one preferred embodiment, the geometrical reality criterion $R_g(u,v)$ is defined as the cardinal function of this set, and corresponds to the area of the apparent surface of the local support S(P(u,v)) in the projection image of the support in the empty scene.

Figure 6:
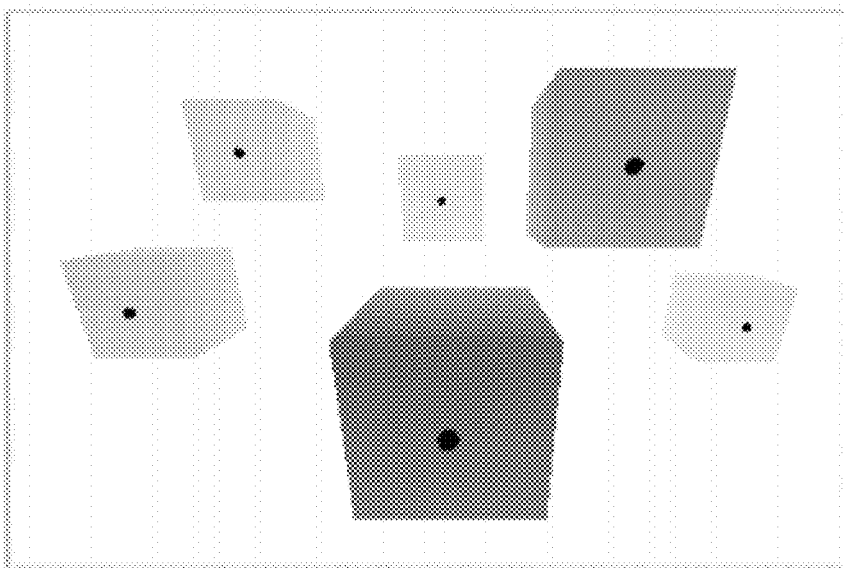
FIG. 6 illustrates a projection of six local supports in one embodiment of the invention.
Figure 7A:
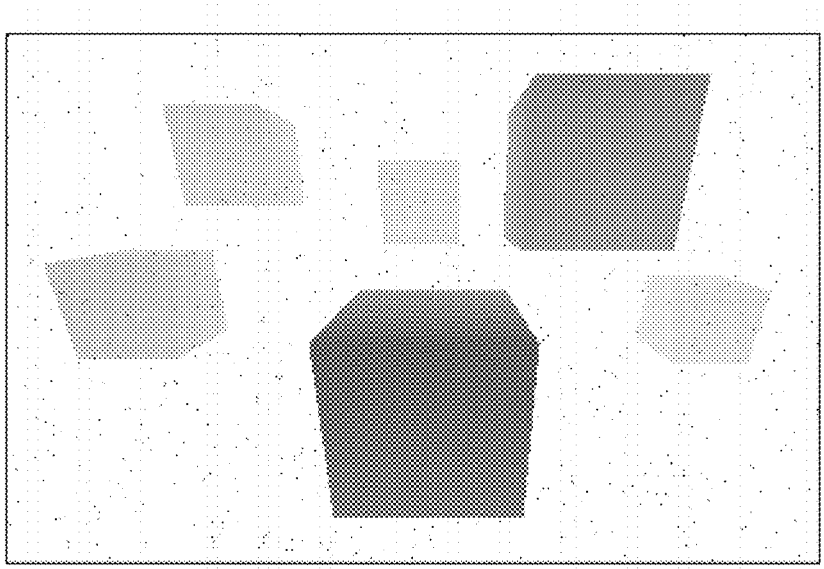
FIGS. 7*a* to 7*f* illustrate the images obtained in the various steps of the filtering method of FIG. 1 according to one embodiment of the invention.
Figure 7B:
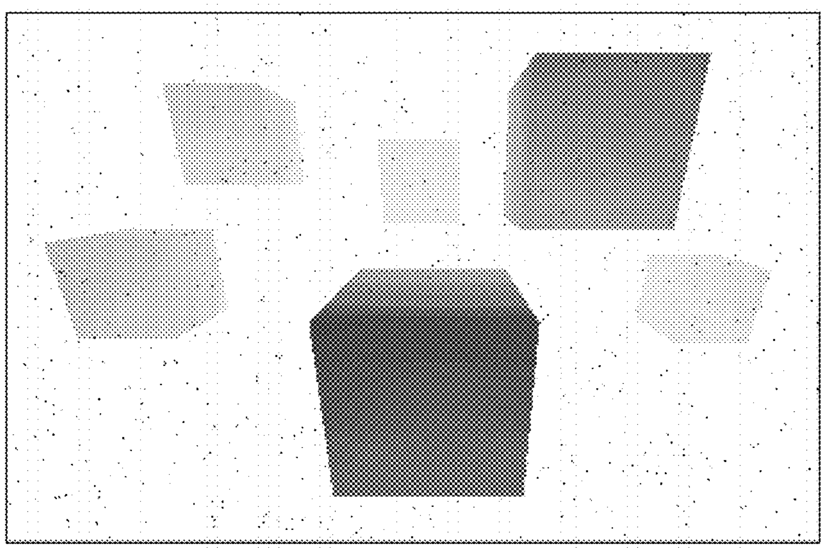
Figure 7C:
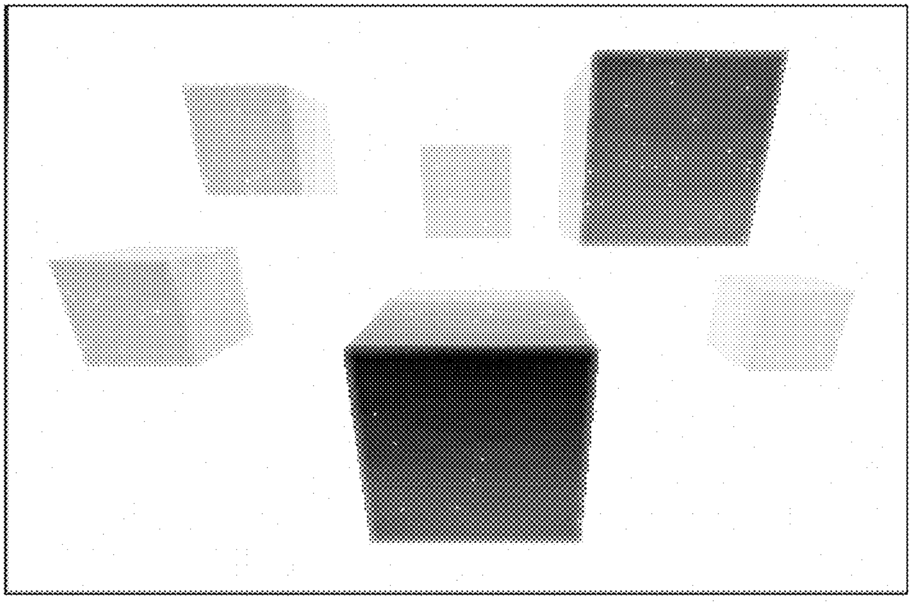
Figure 7D:
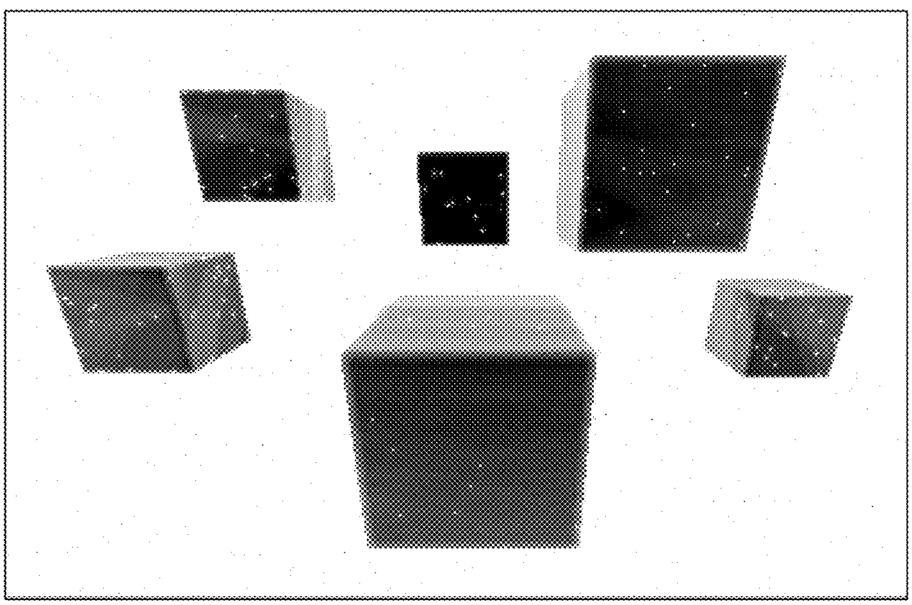
Figure 7E:
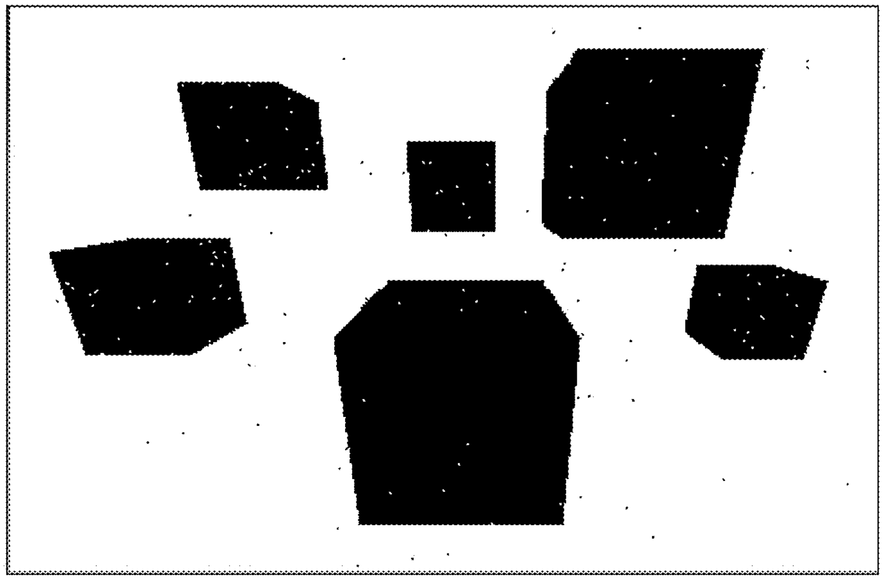
Figure 7F:
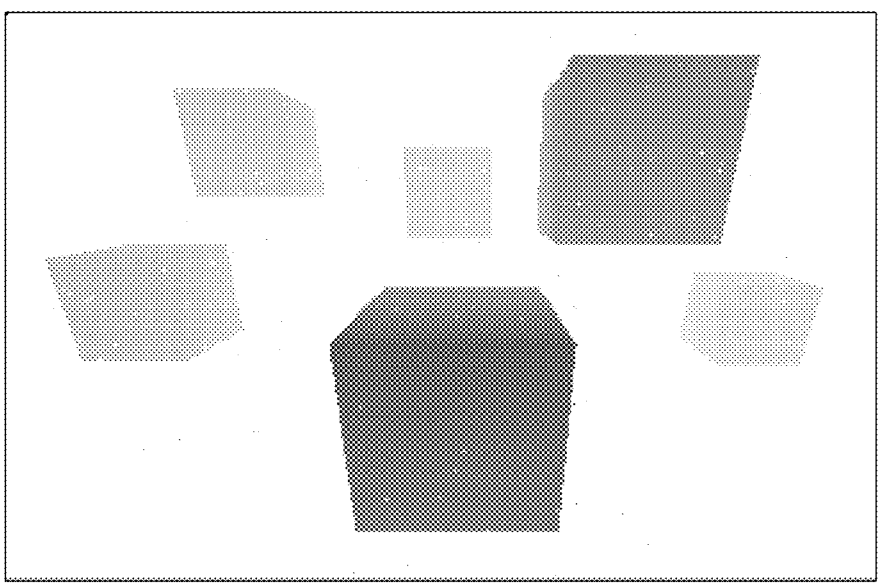

By way of illustration, FIG. 6 shows, for a spherical support, six projections for points with different positions (u, v) and disparity. This example makes it possible to show that the area of the apparent surface of each local support represents the geometrical reality of the corresponding point with coordinates (u, v).

Two implementations of the geometrical reality criterion are possible:

- either a complete pre-calculation is performed for every depth or for every disparity and the result is stored. This implementation favors a shorter processing chain computing time, but requires memory space;
- or a calculation is performed for each projection. This implementation favors a smaller memory, but requires a longer computing time.

Those skilled in the art will appreciate that variant implementations are possible, such as for example performing a pre-calculation with compression and storage of reduced size. This variant requires a decompression calculation in order to re-read the data.

Once the geometrical reality values have been calculated for all of the pixels of the initial image, the method allows a geometrical reality image to be generated (312).

Figure 4:
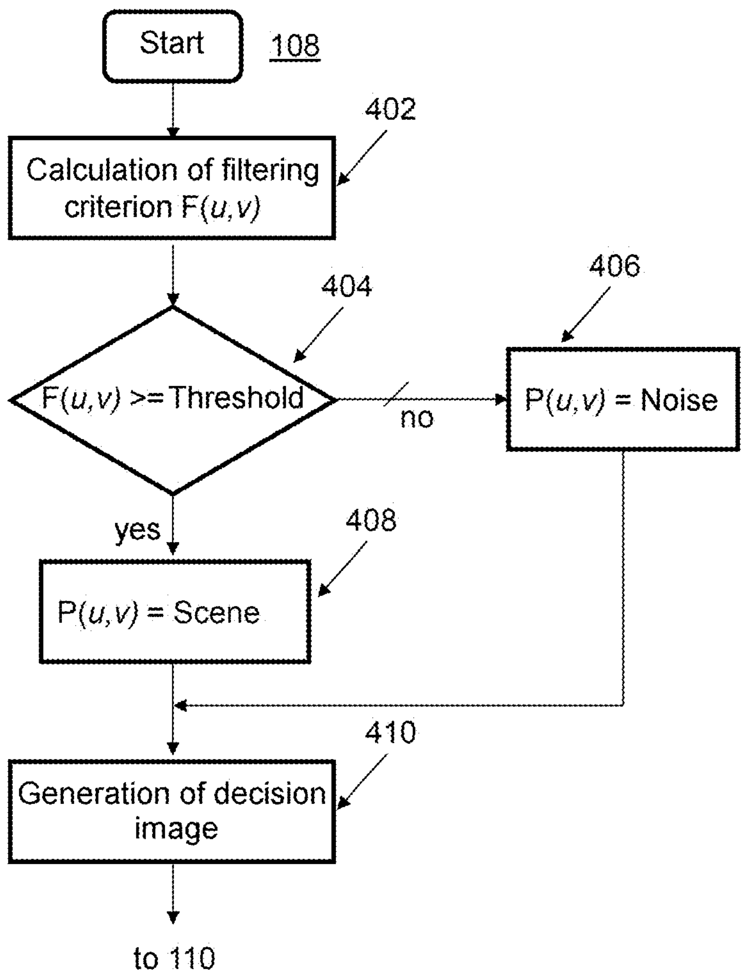
FIG. 4 illustrates the steps of the method for obtaining a decision image according to one embodiment of the invention.

FIG. 4 illustrates the steps of the method (108) of FIG. 1, allowing a decision image to be generated in one embodiment of the invention. The method begins once the spatial coherence and geometrical reality images have been generated. In a first step (402), the method allows a filtering criterion to be defined on the basis of the two spatial coherence 'Cs' and geometrical reality 'Rg' criteria. The filtering criterion will make it possible to discern whether a pixel is a point of the scene or a noise point. The filtering criterion will be calculated for each pixel with coordinates (u,v) of the depth image (or disparity image, respectively).

The filtering criterion F(u,v) is given by a function 'F' combining the spatial coherence $C_s(u,v)$ and the geometrical reality $R_g(u,v)$ of the pixel, and is denoted by:

$$F(u,v)=F(C_s(u,v),R_g(u,v))$$

In one implementation, the function is chosen as the ratio of $C_s$ to a power of $R_g$ according to the following equation:

$$F(u,v)=C_s(u,v)/(R_g(u,v))^{\alpha} \qquad \text{[Eq6]}$$

where the parameter $\alpha$ is used to manage the trade-off between the two criteria of spatial coherence and geometrical reality. Thus, the higher the value of $\alpha$, the greater the extent to which geometrical reality will be favored in the criterion. The specification of $\alpha$ can be parameterized by the user, allowing it to be adapted to the objectives of the application.

By default, the special case $\alpha=1$ is nevertheless intrinsically relevant, and allows the filtering criterion F to be fixed as a degree of fill, fixing the percentage of activated pixels in a coherent zone.

In a subsequent step (404), the method allows the value of the filtering criterion of each point (u,v) to be compared with a threshold value. If the value of the criterion is below a defined threshold (no branch), the point is classified as a noise point (406). If the value of the criterion is above a defined threshold (yes branch), the point is classified as a point belonging to the scene (408).

The next step (410) consists in generating a decision image '$F_\delta$' on the basis of the set of points classified as 'scene' or 'noise' points. The decision image is a binary image that represents a mask of initial data (disparity or depth data) separating the set of data estimated to be correct, where the point is set to '1', from the set of data estimated to be noise, where the point is set to '0'.

When a decision image is generated, the overall method (100) allows a denoised image to be generated (step 110 of FIG. 1) by combining the original (disparity D(u,v) or depth R(u,v)) image with the decision image $F_\delta$. The combination of the two images then depends on the application in question.

In one particular implementation, the denoised image is defined according to the following equations:

$$D_f(u,v)=D(u,v)*F_\delta(u,v)+(1-F_\delta(u,v))*\hat{E}_D(u,v) \text{ in the case of an initial disparity image;}$$

$$R_f(u,v)=R(u,v)*F_\delta(u,v)+(1-F_\delta(u,v))*\hat{E}_R(u,v) \text{ in the case of an initial depth image,}$$

where $\hat{E}_D(u,v)$ and $\hat{E}_R(u,v)$ denote a local estimate of the disparity (D) or depth (R) data, respectively.

Also advantageously, the method of the invention allows, for the filtered image, either the original value of the pixel to be retained or it to be replaced by an estimate.

In one particular embodiment, the estimation function takes a fixed value such that:

$$\hat{E}_{D\ or\ R}(u,v)=K \text{ (fixed value).}$$

This implementation is advantageous for isolating the pixels of the (depth or disparity) image by assigning them to a specifically identifiable value 'K'. One such scenario relates to applications in which it is preferred not to take initially noisy pixels into consideration.

In one typical implementation, K=0 or $K=2^N-1$ for a signal resolved on N bits, so as not to interfere with the range of possible values of the pixel.

If K=0, the values of the output pixels are:

$$D_f(u,v)=D(u,v)*F_\delta(u,v) \text{ for an initial disparity image; and}$$

$$R_f(u,v)=R(u,v)*F_\delta(u,v) \text{ for an initial depth image.}$$

In one variant implementation, the estimation function $\hat{E}_{D\ or\ R}$ (u,v) may be a local interpolation of the data D(u,v) or R(u,v) present (not noisy) in a vicinity of (u,v). It is possible to use bilinear interpolation, or a non-linear operation of weighted median type. This approach is relevant to the obtention of a dense and "smooth" filtered image, for example for visualization or compression purposes; indeed, atypical values such as a discriminant fixed K are incompatible with entropy coding.

Figure 5:
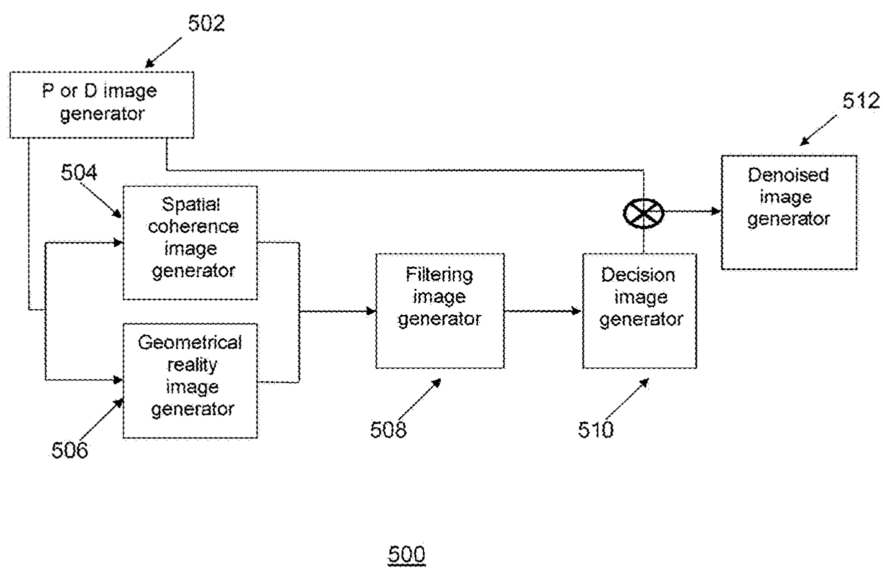
FIG. 5 illustrates the functional blocks of the filtering device of the invention according to one embodiment.

FIG. 5 schematically illustrates the functional blocks of one implementation of the device (500) of the invention for implementing the method of FIG. 1. The device comprises a block (502) allowing an initial 3D disparity or depth image of a scene to be produced. In one implementation, the scene is observed from an inexpensive calibrated stereoscopic sensor and a disparity image (representing the 3D information) is constructed on the basis of a pair of rectified images.

The block (502) is coupled to a first image generation block (504) for generating a spatial coherence image and to a second image generation block for generating a geometrical reality image. The blocks 502 and 504 comprise means allowing the steps described with reference to FIGS. 2 and 3 to be implemented.

The output of the blocks 502 and 504 is coupled to a third image generation block (508) for generating a filtering image. The output of the block 508 is coupled to a fourth image generation block (510) for generating a decision image. The blocks 508 and 510 comprise means allowing the steps described with reference to FIG. 4 to be implemented.

The output of the block 510 is combined with the output of the block 502 for input into a final image generation block (512) for generating a denoised image according to the principles described with reference to step 110.

Thus, the device 500 allows filtering to be applied to a disparity (or depth) image in order to remove noise of natural origin such as rain, glare, dust, or noise linked to the sensors or noise linked to the disparity calculations.

The present invention may be combined with a 3D scene segmentation method. The denoised image (output by the device 500) is transformed into a point cloud, which points are subsequently quantified in a 3D grid composed of l×h×p cells. In order to disconnect the obstacles, which are generally connected by the ground, from one another, a filter is applied that allows those cells of the grid containing ground 3D points to be removed. The remaining cells are subsequently spatially segmented into connected portions using a segmentation method known from the prior art. For example, one method consists in iteratively aggregating cells by connected space.

The removal of points representing noise through the application of the filter of the invention has a positive effect on the performance of 3D segmentation. Specifically, the advantage of the filter for segmentation is that obstacles are often linked by noise points. In this case, it is difficult to spatially segment the various obstacles. Furthermore, the advantage of the quantification is that obstacles are often partially reconstructed in the disparity image. It is therefore difficult, on the basis of the resulting point cloud, to reconnect the various portions of one and the same obstacle. Lastly, the advantage of the removal of the cells corresponding to the ground is that obstacles are often connected by the ground. It therefore makes sense to break these connections.

Those skilled in the art will understand that the given example of a 3D obstacle detector is only one example of scene analysis allowing benefit to be drawn from the disparity image denoising function proposed by the present invention. Nevertheless, the use of filtering such as proposed in the invention, is not limited to searching for obstacles by means of segmentation. It relates to any system for the real-time analysis of a scene on the basis of a noisy depth image or a noisy disparity image.

The present invention can be implemented from hardware and software elements. The software elements may be present in the form of a computer program product on a medium that can be read by a computer, which medium may be electronic, magnetic, optical or electromagnetic.

The invention claimed is:

1. A method for filtering an initial three-dimensional (3D) image, comprising the steps of:

defining a local analysis zone for each 3D point that is associated with each pixel of the initial 3D image;

generating a spatial coherence image for the set of 3D points that are associated with the set of pixels of the initial 3D image, on the basis of a spatial coherence value measured for each 3D point in the local analysis zone, the spatial coherence value being linked to a number of 3D points contained in the local analysis zone of said point;

generating a geometrical reality image for the set of 3D points that are associated with the set of pixels of the initial 3D image, on the basis of a geometrical reality value measured for a pixel associated with each 3D point in the local analysis zone, the geometrical reality value being linked to a number of 3D points that are visible in an image projected into an empty scene of the local analysis zone;

generating a binary image on the basis of the spatial coherence and geometrical reality images, wherein each point of the binary image is classed as a scene point or as a noise point according to the spatial coherence and geometrical reality values obtained for that point; and combining the binary image with the initial 3D image in order to obtain a denoised image.

2. The method as claimed in claim 1, wherein the step of defining a local analysis zone—S(P(u,v))—consists in defining a 3D volume of fixed size, centered on the coordinates P(u, v) of a 3D point that is associated with a pixel.

3. The method as claimed in claim 1, wherein the step of measuring a spatial coherence value—$C_s(u,v)$—for a 3D point comprises the steps of:

determining the set of pixels of the initial image, the associated 3D points of which pixels are contained in the local analysis zone for said 3D point; and defining a spatial coherence value for said 3D point depending on the result.

4. The method as claimed in claim 1, wherein the step of measuring a geometrical reality value—$R_g(u,v)$—for a pixel associated with a 3D point comprises the steps of:

projecting the local analysis zone into an empty scene;

determining the set of 3D points that are visible in the local analysis zone in the image of its projection into the empty scene; and defining a geometrical reality value for said pixel depending on the result.

5. The method as claimed in claim 1, wherein the step of generating a binary image comprises the steps of:

generating, for each 3D point, a filtering value on the basis of the spatial coherence and geometrical reality values;

comparing the obtained filtering value with a threshold value;

classing the 3D point as a scene point or as a noise point depending on the result of the comparison; and generating an image of the set of scene and noise points.

6. The method as claimed in claim 1, wherein the initial image is a disparity image.

7. The method as claimed in claim 1, wherein the initial image is a depth image.

8. The method as claimed in claim 1, wherein the local analysis zone is chosen from a group comprising spherical, cubic, box-shaped or cylindrical representations, or 3D mesh surface representations, voxel representations or algebraic representations.

9. The method as claimed in claim 1, wherein the geometrical reality value is pre-computed.

10. A device for filtering an initial image, the device comprising a storage medium and a computer for implementing the steps of the method as claimed in claim 1.

11. A computer program product, said computer program product comprising a non-transitory storage medium having instructions allowing the steps of the method as claimed in claim 1 to be carried out, when said program is executed on a computer.

* * * * *